RADIATION DETECTOR IN A FREQUENCY RANGE INCLUDING INFRA-RED AND MILLIMETER WAVES

Filed March 21, 1968 2 Sheets-Sheet 1

INVENTORS
KIICHI KOMATSUBARA, NOBUO KOTERA
BY
Craig & Antonelli
ATTORNEYS

INVENTORS
KIICHI KOMATSUBARA, NOBUO KOTERA
BY
Craig & Antonelli
ATTORNEYS

United States Patent Office 3,529,164
Patented Sept. 15, 1970

3,529,164
RADIATION DETECTOR IN A FREQUENCY RANGE INCLUDING INFRA-RED AND MILLIMETER WAVES

Kiichi Komatsubara, Kodaira-shi, and Nobuo Kotera, Kokubunji-shi, Japan, assignors to Hitachi, Ltd., Tokyo, Japan, a corporation of Japan Filed Mar. 21, 1968, Ser. No. 714,845
Claims priority, application Japan, Mar. 31, 1967, 42/19,997
Int. Cl. G01t *1/24*
U.S. Cl. 250—83.3 5 Claims

ABSTRACT OF THE DISCLOSURE

A radiation detector which converts the radiation energy absorbed by a semiconductor body, to which a magnetic field is applied, into a change in electric current running through said body, said change in electric current being caused by the resonance of the carriers energized by the absorption of the radiation energy with the optical phonons in said body.

BACKGROUND OF THE INVENTION

This invention relates to a radiation detector which detects the radiation energy incident on a semiconductor body in the form of a change in electric current running through said body and more particularly to a radiation detector which detects a change in electric current appearing when the carriers absorbing the radiant energy undergo an electronic transition between the energy levels quantized by the applied magnetic field. Generally, techniques of utilizing electromagnetic waves in an infra-red or a millimeter wave region are less developed compared to those in other regions. This fact is at least partly due to the absence of appropriate oscillators and detectors working in these wavelength regions. Therefore, a stable, rigid and appropriate solid state electronic device emitting or detecting electromagnetic waves in said regions should contribute greatly to the development of techniques in said wavelength regions.

SUMMARY OF THE INVENTION

A primary object of this invention is to provide a solid state radiation detector having a high sensitivity and a good frequency characteristic.

Another object of this invention is to provide a rigid and stable solid state radiation detector having the advantages described hereinabove.

As is well known, when a magnetic field is applied to a semiconductor body, the cyclotron motion of the carriers in a plane transverse to the applied magnetic field is quantized and discrete energy levels or Landau levels appear.

When an electric field is applied to the semiconductor body maintained in said state and at a low temperature, the hot carriers energized by the electric field populate into one or a plurality of Landau levels. As the applied electric field is made more intense, the energy of the hot carriers increases and they rise to higher Landau levels.

By using such a transition to higher Landau levels as mentioned above for the generation of the electric oscillation, electromagnetic waves of 0.5 to 50 gHz. can be radiated. Conversely, when a low temperature semiconductor body through which a DC current flows and to which a magnetic field is applied is irradiated with an electromagnetic wave to energize the carriers in the semiconductor body, the carrier population in the Landau levels changes and the value of the electric current, to which the carriers lying in a plurality of Landau levels contribute collectively, changes. Thus, a change in electric current corresponding to the intensity of radiation occurs.

In this invention the sensitivity of the radiation detector is enhanced by making said transition resonate with the optical phonons in the semiconductor body as described hereinbelow.

In summary, the gist of this invention resides in a radiation detector, wherein the electric current running through a semiconductor body maintained at a low temperature and to which electric and magnetic fields are applied is changed in correspondence with the radiation irradiating said body by resonating the carriers energized by the radiation energy with the optical phonons in said body.

The principle, features and advantages of this invention will become more apparent from the following detailed description of the distribution function of carriers and some preferred embodiments of the invention taken in conjunction with the accompanying drawings. In the figures, the same part is denoted by the same reference numeral.

DESCRIPTION OF THE PREFERRED EMBODIMENTS

In order that the energized carriers may undergo a transition between Landau levels as described hereinabove, the following conditions must be satisfied.

Namely, the semiconductor body must have few lattice defects and impurities, must have carriers whose effective mass is small and must be formed of a semiconductor material having a low Fermi energy so that the carriers may perform a substantial cyclotron motion under the applied magnetic field and so that the quantized state thereof may become distinct or exhibit distinct Landau levels. Secondly, the semiconductor body must be maintained at a low temperature, e.g. the temperature of helium, so that the carriers may be distributed in a low energy state.

Figure 1:
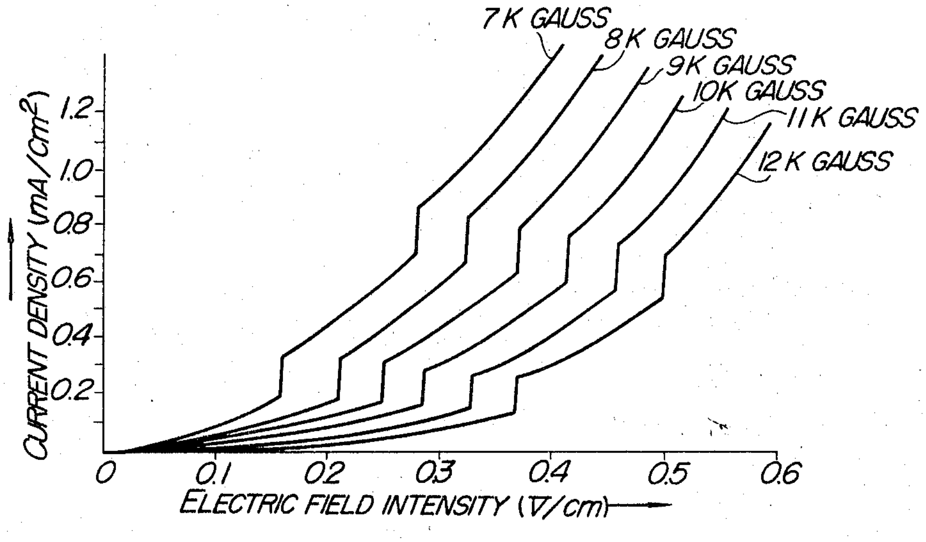
FIG. 1 is a diagram showing the current vs. voltage characteristic of a semiconductor body for the explanation of the principle of this invention.

FIG. 1 shows the current vs. voltage characteristic of a semiconductor body made of N type InSb, containing impurity of $10^{14}$ atoms/cc. and maintained at 1.5° K. and accordingly satisfying the conditions described hereinabove, to which mutually transverse electric and magnetic fields are applied.

In FIG. 1, each curve shows the I–V characteristic under the magnetic field denoted in the drawing and the electric current changes rapidly at a plurality of voltage values under any magnetic field.

Said phenomenon occurs because the carriers energized by the electric field jump to higher Landau levels at a certain voltage value and the population of the carriers in the energy levels changes and thus the electrical conductivity of the semiconductor changes rapidly. Accordingly, if the electromagnetic wave is made to irradiate a semiconductor body applied with a voltage slightly lower than the voltage causing the rapid current variation so as to energize the carriers slightly with the radiation energy, the carriers become capable of populating in higher Landau levels and a rapid current variation similar to the one described hereinabove becomes possible.

The present inventors discovered that a large current variation can be caused by a small amount of radiation if in the above case such a suitable magnetic field that the integral multiple of the energy difference $h\omega$ between the adjacent Landau levels becomes equal to the energy of the optical phonon $h\omega_{op}$ (i.e. one of the Landau levels coincides with the energy level of the optical phonon) is applied to a semiconductor body and the energized carrier is made to jump to said energy level of the optical phonon. Here, $h$ indicates Planck's constant $h$ divided by $2h$, $\omega$ indicates the angular frequency of the cyclotron motion of the carrier and is equal to $eH/m^*c$, $\omega_{op}$ denotes the angular frequency of the optical phonon, $e$ and $m^*$ are the charge and the effective mass of the carrier, respectively, H is the intensity of the applied magnetic field and $c$ is the velocity of light.

Said fact will be described in more quantitative terms. In case of an ordinary transition between the Landau levels, the ratio $\beta$ between the variation rate of the electric conductivity $\sigma'$ and the radiation power P irradiating the semiconductor body, i.e.

$$\beta=\frac{\sigma'}{P}$$

is 10–20, but when said transition interacts remarkably with the optical phonon, $\beta$ becomes 50–100 and thus the sensitivity of the radiation detection is enhanced by a factor 5.

Figure 2:
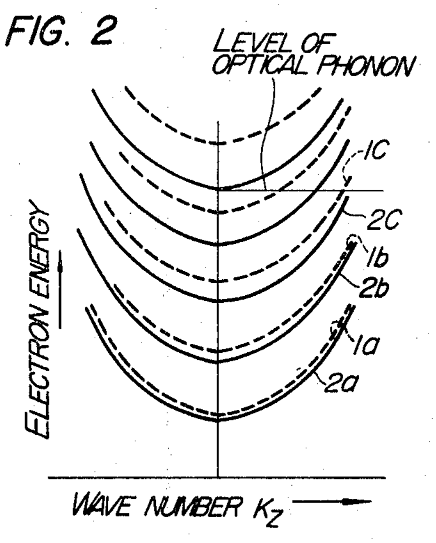
FIGS. 2 and 3 are diagrams showing the energy diagram and the electron distribution function of a semiconductor body for the explanation of the principle of the invention.

Said effect due to the interactions with the optical phonon is ascribed to the following phenomenon. FIG. 2 shows the energy diagram of the carriers of a semiconductor body to which a magnetic field is applied. In an ordinary case, the carriers energized by the applied electric field distribute in Landau levels indicated by 1$a$, 1$b$, 1$c$, . . . and an electron distribution as shown by curve 3 in FIG. 3 appears.

Figure 3:
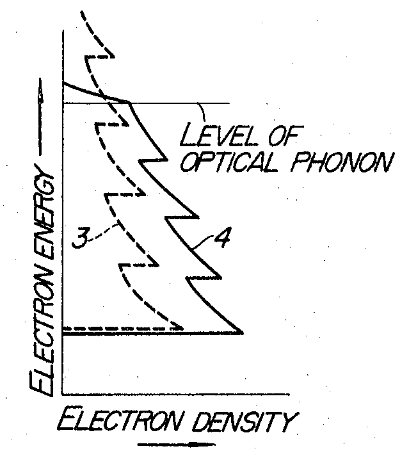

When a magnetic field having some particular intensity is applied to a semiconductor body and one of the Landau levels denoted by 2$a$, 2$b$, 2$c$ . . . coincides with the energy level of the optical phonon, i.e. $nh\omega=h\omega_{op}$ ($n$ is an integer), the carrier energized to the Landau level having the same energy as the energy level of the optical phonon resonates with the optical phonon, emits an optical phonon and falls into a lower energy state. Accordingly, an electron distribution function as indicated by curve 4 in FIG. 3 is realized. Thus, when a carrier is energized to the same energy as the energy level of the optical phonon due to the applied electric field and the radiation energy, the carrier undergoes a particular transition and the electron distribution function is deformed to a particular form and thereby a large change in electric conductivity occurs. In this way, a small amount of radiation energy can cause a large change in electric current. In the case of a semiconductor body made of N type InSb and containing impurity of $10^{13}$–$10^{14}$ atoms/cc., it is possible to make one of the Landau levels coincide with the energy level of the optical phonon and to induce said resonance transition by applying a magnetic field lying in the range of 5–10 kilogauss to said semiconductor body.

In case of a semiconductor body made of N type InAs and containing impurity of $10^{13}$–$10^{14}$ atoms/cc., said resonance transition can be induced by the application of a magnetic field in the range of 5 to 30 kilogauss.

Further, said resonance transition can be induced in case of a semiconductor body made of Bi or PbTe having a higher purity.

Figure 4:
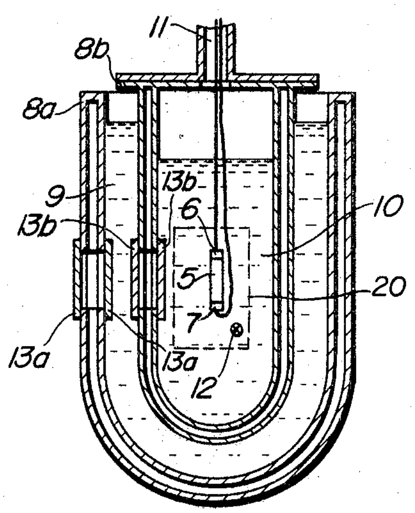
FIGS. 4 and 5 are sectional diagrams of the embodiments of this invention.

FIG. 4 shows the structure and arrangement of a preferred embodiment of this invention in cross sectional form. In the figure, reference numeral 5 indicates a semiconductor body made of N type InSb containing impurity of $2\times10^{14}$ atoms/cc. and formed into a bar shape having a rectangular cross section, and 6 and 7 denote electrodes joined to both ends of the semiconductor body 5 and to which a DC voltage is applied. The semiconductor body 5 is immersed into liquid He contained in a Dewar vessel 8$b$ precooled by liquid nitrogen 9 in a Dewar vessel 8$a$. Reference numeral 11 denotes an evacuation tube connected to a vacuum system (not shown) and 12 indicates a magnetic field to be applied to the semiconductor body and the direction thereof is into the drawing. Reference numeral 20 denotes one of the pole pieces of an electromagnet for generating the field 12. Reference numerals 13$a$ and 13$b$ show window structures provided to the Dewar vessels 8$a$ and 8$b$, respectively, for the external radiation to irradiate the semiconductor body.

As is evident from the figure, the electric and magnetic fields applied to the semiconductor body are mutually transverse in this embodiment.

In the arrangement described hereinabove, a current variation of 50$\mu$a. was observed by irradiating a semiconductor body with an electromagnetic wave of 1 $\mu$w. when a magnetic field of 9 kilogauss and an electric field of 0.4 v./cm. were applied to the semiconductor body and the temperature of the liquid. He was made to be 1.5° K. by reducing the vapor pressure of He with the evacuation system. Further, when black body radiation light of 1 $\mu$w. was projected, a current change of 50 $\mu$a. was observed.

Figure 5:
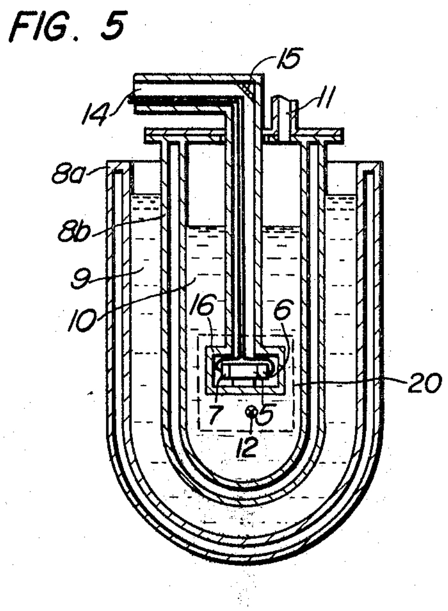

In the embodiment described hereinabove, a device comprising window structures is presented. Now another embodiment of the invention comprising a path structure for leading radiation to a semiconductor body is shown in FIG. 5.

In the same figure, 14 denotes a path structure for radiation, 15 indicates means for reflecting and deflecting radiation provided at the path structure 14, and 16 indicates a vessel containing the semiconductor body 5 and joined to the path structure 14. As to the other parts, the same parts as shown in FIG. 4 are denoted by the same reference numerals.

According to the present invention, the carrier energized by a small amount of radiation resonates with an optical phonon and a carrier distribution function changes anomalously and thereby a large change in conductivity takes place in a semiconductor body. Thus, a detector according to this invention has a high detection sensitivity independent of a frequency as seen from the results of the embodiments. As has been fully described hereinabove, this invention overcomes the deficiencies of a conventional detector having a low sensitivity and/or a poor frequency characteristic and provides an excellent radiation detector in an infra-red or millimeter wave region.

Though some preferred embodiments of this invention have been described for the sake of simple explanation of the invention hereinabove, it will be evident to those skilled in the art that various changes and modifications can be made. It is to be noted that such changes or modifications which do not depart from the spirit of this invention are covered in the appended claims.

We claim:

1. A radiation detector in a frequency range including infra-red and millimeter waves, comprising a semiconductor body whose carriers are substantially capable of quantized cyclotron motions under an applied magnetic field; means for applying such a magnetic field as to make one of the Landau levels formed by said cyclotron motions coincide with the energy level of an optical phonon of said body; means for drifting carriers populating in said Landau levels; means for making said body receive radiation so as to make said carriers resonate with said optical phonon; and means for detecting the change in an electric current caused by said drifting carriers at said resonance.

2. A radiation detector in a frequency range including infra-red and millimeter waves, comprising a semiconductor body having a few lattice defects and impurities so that the carriers may substantially perform quantized cyclotron motions in a plane transverse to the applied magnetic field and having carriers whose effective mass is small so that the energy difference between the discrete Landau levels formed by said cyclotron motions may become large; means for cooling said body to a low temperature sufficient to make said carriers populate in lower energy states of said levels; means for applying such a magnetic field that forms said Landau levels in said body and makes one of said levels coincide with the energy level of the optical phonon in said body; means for conducting an electric current through said body in a way to energize said carriers near to said level; means for introducing radiation into said body provided to said cooling means in a way to energize a part of said carriers to said level, to make said part of carriers resonate with the optical phonon and to emit an optical phonon from said carriers; and electric means connected to said conducting means in a way to detect the current variation based on the change of carrier population caused by said phonon emission.

3. A radiation detector according to claim 2, wherein said semiconductor body is made of a semiconductor material selected from the group consisting of InSb, InAs, Bi and PbTe.

4. A radiation detector according to claim 2, wherein the direction of said applied magnetic field and that of said conducting current are substantially perpendicular to each other.

5. A method of detecting the electromagnetic radiation in a frequency range including infra-red and millimeter waves, comprising the steps of applying a magnetic field to establish Landau levels in a semiconductor body; cooling said body so that the carriers populate in lower energy states of said levels; equalizing a level of said levels to the energy level of an optical phonon in said body; passing an electric current through said body to energize said carriers to the energy near said level; subjecting said body to said radiation to energize said carriers to said level; resonating said carriers with said optical phonon and emitting the optical phonon from said carriers; and measuring the change of said electric current based on the change of the carrier population in said levels at said phonon emission.

References Cited

UNITED STATES PATENTS

| | | | |
|---|---|---|---|
| 3,070,698 | 12/1962 | Bloembergen ------- | 250—83.3 |
| 3,219,823 | 11/1965 | Gibson et al. ------ | 250—83.3 |

RALPH G. NILSON, Primary Examiner

D. L. WILLIS, Assistant Examiner

U.S. Cl. X.R.

250—83